United States Patent [19]

Westerberg

[11] 4,385,835
[45] May 31, 1983

[54] COMPENSATING DEVICE

[75] Inventor: Gerhard Westerberg, Djursholm, Sweden

[73] Assignee: Micronic AB, Danderyd, Sweden

[21] Appl. No.: 248,448

[22] Filed: Mar. 27, 1981

[30] Foreign Application Priority Data

Apr. 3, 1980 [SE] Sweden ................................ 8002604

[51] Int. Cl.³ .............................................. G01B 9/02
[52] U.S. Cl. .................................................. 356/358
[58] Field of Search ............... 356/345, 346, 357, 358, 356/363

[56] References Cited

U.S. PATENT DOCUMENTS 3,520,613  7/1970  Chitayat ............................. 356/345
3,809,481  5/1974  Schindler ........................... 356/346
4,053,231 10/1977  Fletcher et al. ................. 356/346 X Primary Examiner—John K. Corbin
Assistant Examiner—Matthew W. Koren
Attorney, Agent, or Firm—LeBlanc, Nolan, Shur & Nies

[57] ABSTRACT

A compensating device in combination with a laser interferometer, which laser interferometer comprises a laser (1), a prism (6) rigidly connected to a movable object, a beam splitter prism (2) and a stationary prism (3). The wavelength of the laser light is subject to changes by external factors, for example meteorologic ones. The compensating device includes mechanism (4,5) capable to change the position of the stationary prism (3) in response to and by means of an electric signal, which represents the desired compensation for magnitudes affecting the accuracy of the laser interferometer.

3 Claims, 1 Drawing Figure

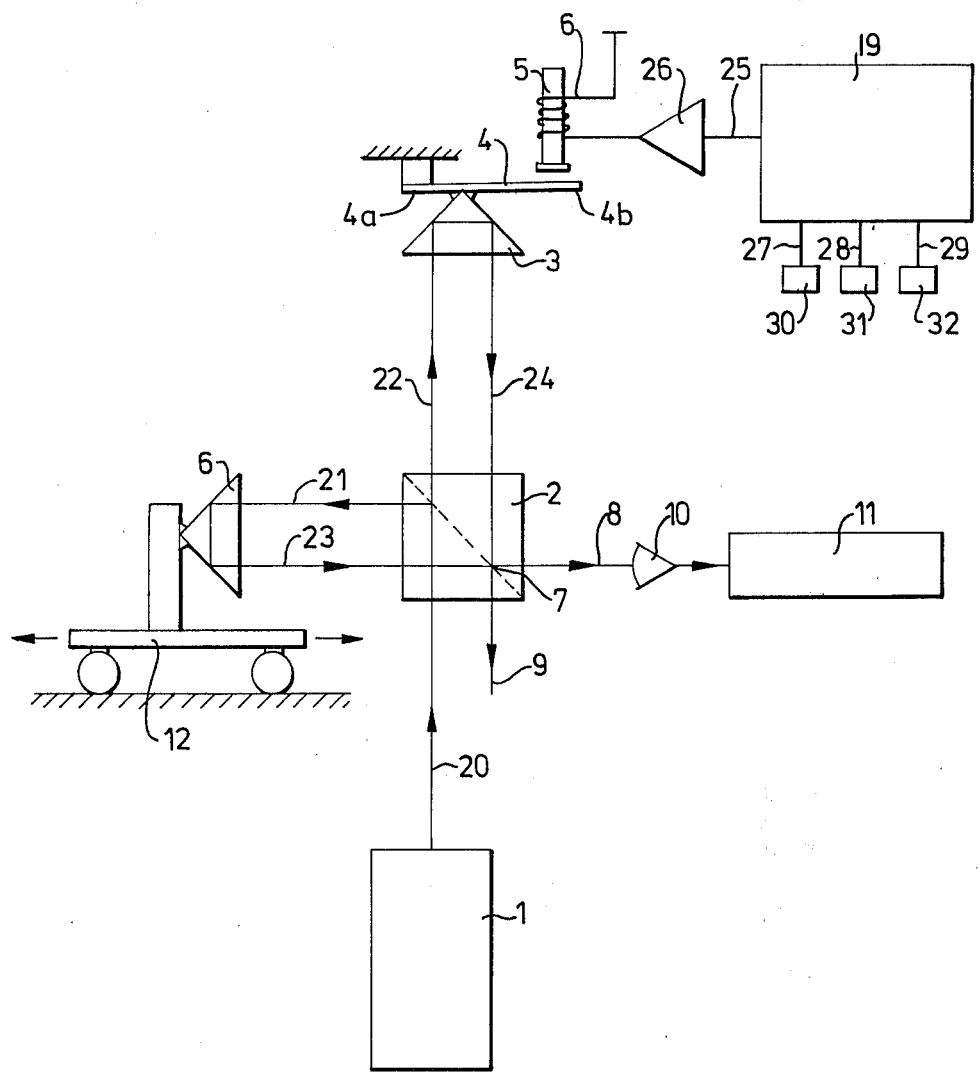

COMPENSATING DEVICE

This invention relates to a compensating device for a laser interferometer, for example for use at range measurements.

Accurate range measurement by laser interferometer has been used prior to the present invention the purpose of position determination in machine tools and precision instruments, among other purposes.

The accuracy, however, is affected among other things by the dependency of the laser wavelength on the pressure, temperature and, to some extent, moisture of the air. These meteorologic conditions, thus, influence the measurement accuracy.

The present invention, therefore, has the object to provide a compensating device used with a laser interferometer, for example for range measurement, which laser interferometer comprises a laser, a prism rigidly connected to a movable object, a beam splitter prism and a stationary prism, by means of which all sorts of compensation for wavelength variations due to external factors can be carried out. The invention is characterized, in that the stationary prism is rigidly connected to the compensating device, which comprises means capable of changing the position of the stationary prism in response to and by means of an electric signal transmitted to the compensating device from a unit, which signal represents desired compensation for conditions affecting the accuracy and reproducibility of the laser interferometer.

An embodiment of the invention is described in the following by way of example, with reference to the accompanying FIGURE, which schematically shows a laser interferometer with the invention applied thereto.

In the FIGURE, the numeral 1 designates a laser, which transmits a laser beam 20 with the wavelength $\lambda$. The beam 20 is split in a beam splitter 2 into two beams perpendicular to each other. One 21 of the resulting beams meets a prism 6 rigidly connected to a movable object 12 and is reflected by said prism. The second resulting beam 22 meets a stationary prism 3, also called reference mirror, and is reflected thereby. The beams 23,24 thus reflected meet at the same point 7 in said beam splitter prism 2 and are superposed, whereby interference between the two beams is obtained. At the meeting point 7 in prism 2 the beam is divided into two superposed beams 8,9 perpendicular to each other. One 8 of these beams, as indicated in the FIGURE, or both beams are amplified and detected. In the FIGURE, the numeral 10 designates a detector for detecting the superposed beam 8. Superposed beams 8,9 are amplified and attenuated periodically for each movement equal to $\lambda/2$ of the movable object 12. By detecting and calculating these periodic variations in a detector 10 and position recorder 11, thus, changes in the position of the movable object are obtained with good precision.

The laser interferometer described above is of known type, and each component therein is known.

According to the present invention, a compensating device 4,5 is located adjacent and in engagement with the reference mirror 3 in order to effect movement of the reference mirror 3 in the direction from and to the beam splitter prism 2. The compensating device 4,5 is arranged to move the reference mirror 3 in the said direction in response to electric signals. By moving the reference mirror 3 in this way, it is possible to compensate, for example, for a change in the wavelength of the laser beam and thereby render the laser interferometer independent of wavelength variations due, for example, to meteorologic condition changes.

In the accompanying FIGURE one embodiment of the compensating device is shown.

According to this embodiment, the reference mirror 3 is attached to an armature 4 associated with a stationary electromagnet 5. The movements of the reference mirror here in question are very small. Movements having the size of one or some $\mu$m are sufficient to effect compensation for wavelength variations. The armature 4, therefore, is firmly clamped at one end 4a and freely suspended at its other end 4b, upon which end the electromagnet 5 is intended to act. The reference mirror 3 is attached substantially centrally between both said ends. The armature 4 consists of a resilient metal sheet. By adjusting the current through the winding 6 of the electromagnet 5, thus, it is possible to adjust the distance of the second end 4b of the armature to the electromagnet 5, whereby the distance of the reference mirror 3 from the beam splitter prism 2 is adjusted.

The numeral 19 in the FIGURE designates an electronic unit of known kind, which is capable to emit at its output 25 an output signal, which corresponds to the total influence of different magnitudes on the laser wavelength. This signal then is amplified in an amplifier 26 feeding the winding 6 of the electromagnet 5.

When a wavelength compensation in response to the meteorologic conditions of air pressure, temperature and moisture is desired, the unit 19 is arranged to receive an electric signal representing each one of these conditions at the inputs 27, 28,29. Transducers 30,31,32 for generating the signals representing these conditions may be of a suitable known type, each of which transmits an electric signal representing one of the conditions. The unit 19 comprises a memory and a calculation unit, such as a microcomputer (not shown) of a suitable known type. In the memory, information is stored on how each meteorologic condition affects the laser wavelength. When the transducers 30,31,32 transmit signals to the unit 19, the unit is capable to compare these signals with values of the influence of each condition on the wavelength as stored in the memory and thereafter to calculate and to emit at the output 25 a signal representing the total influence of the meteorologic conditions on the laser wavelength.

The signal at the output 25 is amplified, as stated above, whereafter the electromagnet 5 affects the position of the armature 4 and therewith of the reference mirror 3, whereby compensation is obtained.

The compensating device apparently is extremely simple and, in spite of its simplicity, yields highly accurate movements of the reference mirror 3. The unit 19, of course, may have a structure and function other than described above for generating a signal to affect the armature.

The structural design of the unit 19 is not a part of the present invention and, therefore, it is not described here in greater detail.

The compensating device, of course, can be controlled by a type of unit other than that described. Such a unit may be arranged to scan other conditions, for example thermal effects on mechanic components or retading effects in electronic circuits, and be capable at its output to generate a signal for moving the reference mirror 3 so as to compensate for the effect of the condition on the measurement accuracy.

The compensating device 4,5 is arranged for effecting compensation in response to an electric signal.

In another advantageous embodiment thereof the electromagnet 5 and the armature 4 are replaced by a piezoelectric device of known type, which effects changes in the position of the reference mirror by applying voltage to the piezoelectric device.

Such modifications are regarded covered by the present invention.

The present invention, thus, must not be regarded restricted to the above embodiments, but can be varied within the scope of the attached claims.

I claim:

1. A compensating device in a laser interferometer, used for example for range measurement, the laser interferometer comprising a laser (1), a prism (6) rigidly connected to a movable object, a beam splitter prism (2) and a stationary prism (3), characterized in that said compensating device is rigidly connected to the interferometer stationary prism (3) and comprises means (4,5) capable of and for changing the position of said stationary prism (3) in a direction towards and away from the beam splitter prism in response to and by means of an electric signal transmitted to said compensating device from a unit (19) designed to sense at least a condition which influences the wave length of the laser light and thereby affects the accuracy of the laser interferometer, whereby said electrical signal to said compensating device represents the desired control input to said compensating device to provide desired movement of said stationary prism to provide compensation within the interferometer for said condition.

2. A compensating device in a laser interferometer as defined in claim 1, characterized in that said means comprises a resilient elongate armature (4) means firmly clamp one end (4a) of said armature which is free at its other end (4b), an electromagnet (5) adjacent and mounted to impart electromagnetic force on said free end (4b), said stationary prism (3) is attached to said armature (4), and circuitry including said electromagnet (5) is adapted to be supplied with the electric signal from said unit (19).

3. A compensating device as defined in claim 1 or 2, intended to compensate for variations in the wavelength of the laser light due to changes in meteorologic conditions, characterized in that the unit (19) is capable of processing and generating said electric signal correlated to the effect of the atmospheric pressure, temperature and air humidity on the wavelength of the laser light in the interferometer.

* * * * *